United States Patent [19]

Sprague

[11] 3,804,521
[45] Apr. 16, 1974

[54] OPTICAL DEVICE FOR MEASURING SURFACE ROUGHNESS

[75] Inventor: Robert A. Sprague, North Chelmsford, Mass.

[73] Assignee: Itek Corporation, Lexington, Mass.

[22] Filed: Feb. 22, 1972

[21] Appl. No.: 228,197

[52] U.S. Cl................. 356/109, 356/120, 356/210
[51] Int. Cl. ............................................. G01b 9/02
[58] Field of Search .......... 356/106, 109, 210, 103, 356/104; 331/94.5 A, 120

[56] References Cited
OTHER PUBLICATIONS

"Ensemble-Averaged . . . Length," Japanese Jrl. of Appl. Physics, Vol. 9, No. 5, 5/70, Nagata et al.
"The Statistical . . . Matte-Glass Surfaces," 15 Optics & Spec 57 G. Gordinsky.
"Interferometric Surface Roughness Meas" 8 Applied Optics 2173 William Ribbens.

Primary Examiner—Ronald L. Wibert
Assistant Examiner—Conrad Clark
Attorney, Agent, or Firm—Homer O. Blair; Robert L. Nathans; David E. Brook

[57] ABSTRACT

An optical device for characterizing the surface roughness of a sample is disclosed. A source of spatially coherent light having a wide spectral bandwidth is provided together with means to direct light from the source onto the rough surface. Means to image light scattered by the sample's rough surface, such as an imaging lens, are provided in the path of the light scattered by the rough surface. The imaged, scattered light is sensed with a light detector to determine its speckle contrast. Decreases in speckle contrast have been found to be directly relatable to increases in surface roughness, as it is customarily measured by mechanical devices such as profilometers.

9 Claims, 4 Drawing Figures

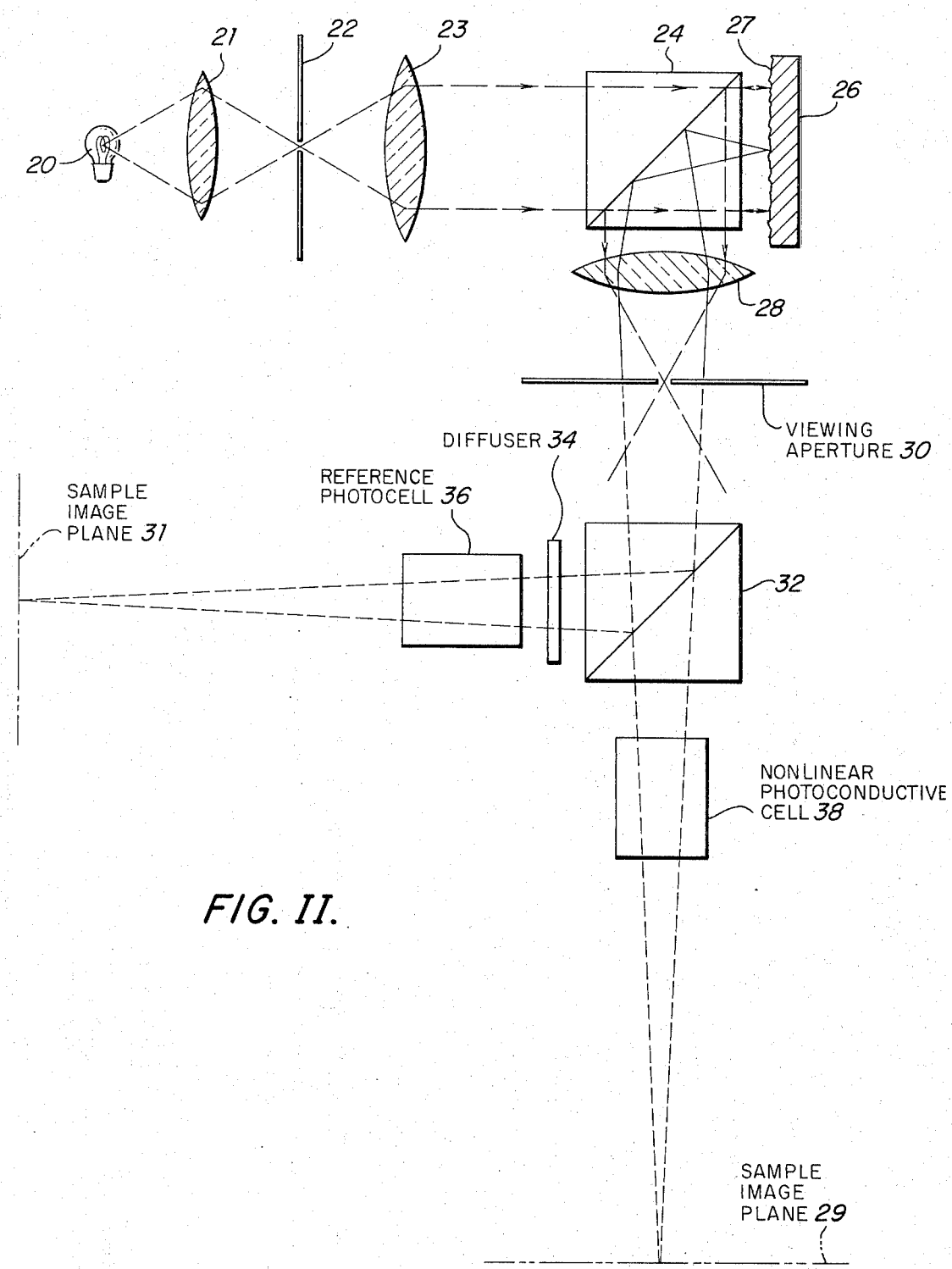
FIG. II.

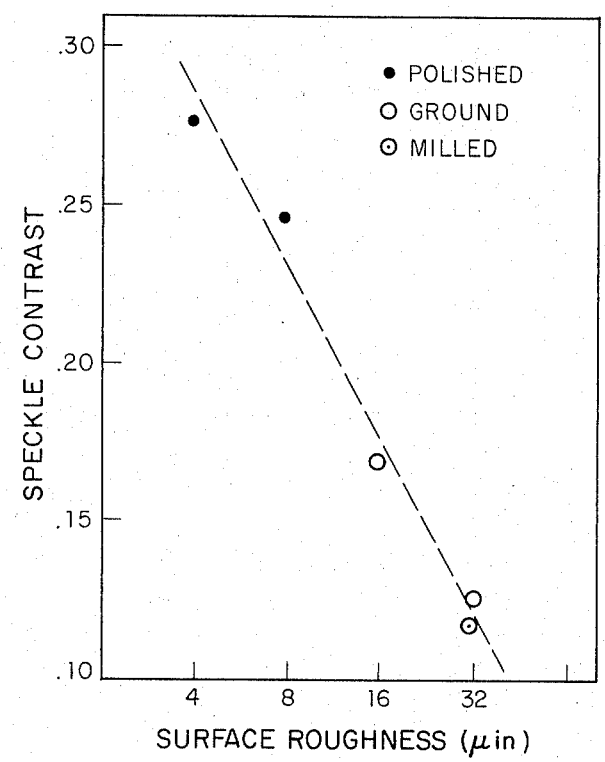
FIG. III.
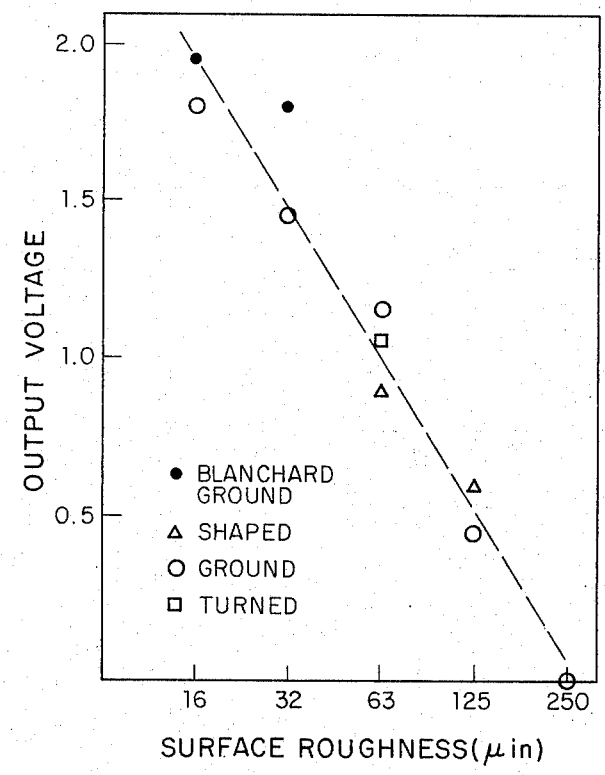
FIG. IV.

OPTICAL DEVICE FOR MEASURING SURFACE ROUGHNESS

BACKGROUND OF THE INVENTION

1. Field of the Invention

This invention relates to an optical device for characterizing the surface topography of an opaque sample by detecting the speckle contrast of spatially coherent but non-temporally coherent light scattered by the rough surface.

2. Description of the Prior Art

It is often important, and sometimes even critical, to characterize the surface topography of a sample. For example, it is often essential, in controlling the quality of such items as lithographic printing plates, paper, the machine finish on metals, optical components, drafting film, etc., to be able to characterize the rough surface characteristics of these materials. One can readily see that there are almost an infinite number of surface topographies possible.

The roughness of machine finished metals is presently measured using a stylus-type device in the following way. A narrow stylus (standard ball radius is 500 microinches) is traced across the metal surface in a direction perpendicular to the surface lay. The stylus is attached to an electro-mechanical device which reads out the profile as a time-varying voltage. This signal is filtered to only include frequencies above a certain cutoff. The inverse of this cutoff frequency, when measured in terms of actual distance on the surface, is called the "roughness width cutoff" (standard cutoff = 0.030 inch). An arithmetic average of the modulus of the difference between the filtered signal and its mean value is used to define surface "roughness."

Within the last few years, a universal unit of measurement for surface roughness has been favored by the various standards associations to serve as an index to the degree, magnitude or average size of the surface irregularities. This unit is known as the arithmetical average deviation from the mean, and is measured using the known unit of measurement, the micro-inch. It takes into consideration all variations in the surface geometry.

The arithmetical average deviation from the mean is defined as the average of an infinite series of distances measured in microinches from the nominal or mean surface line to the actual irregular contour of the surface being measured. Microinches are millionths of an inch and have been selected as the basic unit for surface roughness measurement because the roughness irregularities of ordinary machined metal surfaces are of such magnitude that their average roughnesses can be expressed in terms of the simple whole numbers 4, 8, 16, 32, 63, 125, etc. Arithmetical average deviation from the mean is the currently accepted standard used by the United States of America Standards Institute as defined in their standard number USAS B46.1-1962.

Prior art devices available for characterizing surface topographies generally include stylus-type and optical-type devices.

Although stylus-type devices are customarily used to measure surface roughness in terms of arithmetic average deviations from the mean, their use presents problems. This is because of the sensitive adjustment required, the finite size of the stylus, and because the diamond stylus scratches the surface. It is thus desirable to obtain the same measurement with a non-contacting optical device.

Optical devices have the advantage of not requiring surface contact which substantially eliminates the possibility of damage to the surface which exists with stylus-type devices. Optical devices also provide an additional dimension in the coverage of the rough surface to be characterized. On the other hand, optical methods have not always proved satisfactory since many such devices are expensive, difficult to use, and provide insufficient data or data which are difficult to interpret. One severe drawback to optical devices heretofore known is their inability to provide output data directly relatable to the standards used for surface roughness by most people. This is partly due to the fact that there are many complex factors which affect reflected light besides surface roughness. For example, the characteristics of light reflected by a rough surface are affected by the surface height distribution function, the correlation widths of the surface profile, and the reflectivity of the metal. The difficulty lies in separating out from these characteristics a good measure of the average surface height, independent of the other surface parameters. Measurements of specular reflection have been used at times to measure surface roughness, but have been of limited applicability because of their susceptibility to variation of all these other surface characteristics.

It would be a particular advantage therefore, if an optical device could be designed which would retain the basic advantages of optical surface roughness measuring devices while also providing output data directly relatable to generally accepted definitions of surface roughness such as that stated in USAS B46.1-1962. Heretofore, such devices have not been available.

SUMMARY OF AN EMBODIMENT OF THE INVENTION

In one embodiment of this invention, an optical device is provided for characterizing the surface roughness of a sample in terms customarily employed in measuring surface roughness.

A source of spatially coherent light having a wide spectral bandwidth is provided. This light is directed by suitable means onto the surface of the sample whose surface roughness is to be characterized. Scattered light from the sample's surface is imaged, and means are provided to sense the speckle contrast of the imaged scattered light either at the image plane or at an out-of-focus plane.

Additionally, a process is described herein for characterizing surface roughness by measuring the speckle contrast of the imaged scattered light.

The optical surface roughness meter and technique for determining surface roughness described herein have many advantages over those of the prior art. For example, in general, the desirable features of stylus-type devices are preserved, e.g., the data obtained are directly related to those terms customarily used for defining surface roughness.

The devices described herein are extremely simple from a mechanical point of view, and they normally don't require optical components of extremely high quality. Further, the devices of the invention are easy to use contrasted to prior art optical devices for the same purpose, which often require sophisticated alignment techniques, extensive vibration control, and which produced data upon which difficult data reductions and analyses had to be made to obtain results related to surface roughness. Since the new devices are non-contacting in nature, one of the best features of previously available optical devices is also preserved. Also, since the sample does not have to be an integral part of the device as in some prior devices, it is possible to use the devices described herein to determine surface properties of large samples. Because the sample can be moved, it is also possible to use the devices described herein as a quality control device in a production line where the device would scan the surface properties of passing samples.

A most unique and important feature of the new devices and methods described herein is that they produce output data which are directly and easily relatable to the standards for surface roughness universally accepted today. This has not been true of prior art optical devices for characterizing surface roughness.

BRIEF DESCRIPTION OF THE DRAWINGS

FIG. I illustrates, in diagrammatic form, an optical device of this invention for characterizing the rough surface of an opaque sample;

FIG. II illustrates, in diagrammatic form, an alternate embodiment of an optical device of this invention for characterizing the rough surface of an opaque sample;

Figure 1:
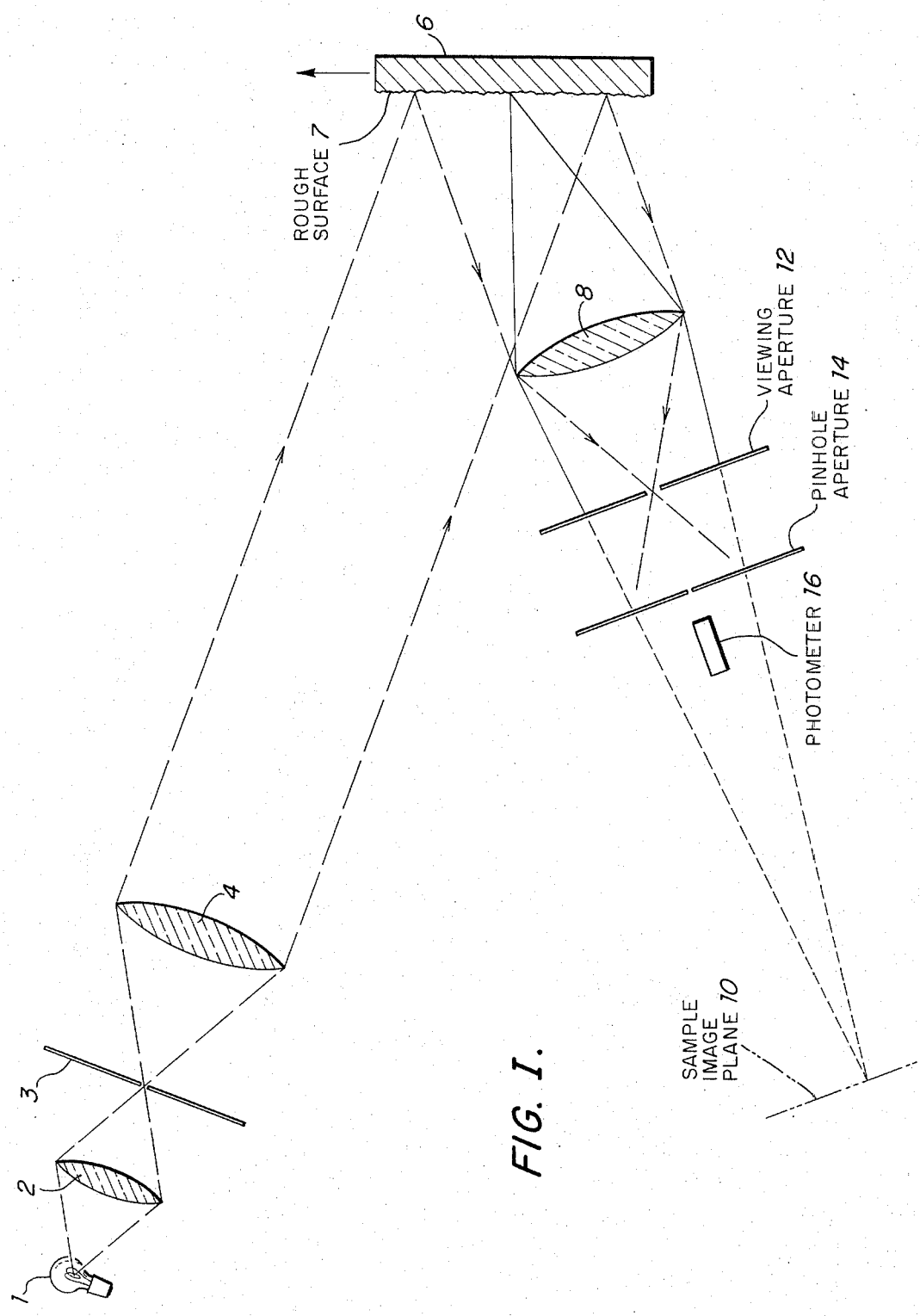

FIGS. III and IV present plots of data obtained using optical devices as described herein.

THEORY OF THE INVENTION

The following theory and definitions are presented as an aid to understanding the invention.

As is known by those skilled in the art, any source has two measures of coherence. Spatial coherence relates to the lateral separation of two illuminated pinholes which can be achieved before their diffraction pattern fringes have zero contrast. The separation of the pinholes at this point is known as the "coherence width" of the source. Temporal coherence relates to the pinhole separation which can be produced along the beam (and viewed in reflection) before the fringes disappear. A more detailed description of spatial and temporal coherence can be found in the following reference, the teachings of which are hereby incorporated by reference: Stone, John M., *Radiation and Optics*, McGraw-Hill Book Co., New York, N.Y., 1963, pp. 299–309.

Temporal coherence can be measured for a particular source by determining the distance along the light path one of the mirrors in a Michelson or Tyman-Green interferometer can be moved while still observing interference in the output plane, either as fringes in the plane or variation of the output intensity with additional movement of one of the mirrors. In such an interferometer, the oscillations of the observed patterns are dampened if the light is not monochromatic. In particular, if one of the mirrors is moved far enough, interference in the output completely disappears. The actual path length separation of the mirrors at this point is called the "coherence length" of the source (including the detector) and is given by $L_c = c/\Delta\lambda$ for a source with a square spectral disribution, where $L_c$ is the coherence length, c is the speed of light, and $\Delta\lambda$ is the spectral bandwidth of the source-detector combination.

In a manner analogous to the Tyman-Green interferometer, speckle is an interference pattern produced when light is reflected from separate positions on the rough surface having different heights. If the "coherence length" of the light is much greater than the average roughness, high contrast interference will be observed in the speckle. Alternatively, if the "coherence length" is much less than the surface roughness, very little interference will be seen. In the region of roughness values which are comparable in magnitude to the coherence length, however, a marked change in speckle contrast is observed for changes of roughness or coherence length. In particular, the ratio of roughness to coherence length should be within the range of about 0.1 to 10 for accurate measure of roughness using the techniques of this invention. Within this range, the slope of the curve relating speckle contrast to roughness is high, enabling one to pick out small differences in surface roughness from the noted differences in speckle contrast.

Those skilled in the art will be able, using these relationships, to determine the proper spectral bandwidth required for characterization of a particular rough surface.

As used herein, speckle contrast means the average of the absolute deviations from the mean of the intensity in a speckle pattern divided by the mean intensity of the pattern. Usually, the average deviation is an arithmetic average, but other averaging techniques, such as route mean square, can also be used.

Thus, it can be appreciated that observed decreases in speckle contrast formed in non-monochromatic illumination from that formed in monochromatic illumination with spatially coherent light scattered by rough surfaces is directly related to the height of irregularities on the surface. The devices and methods described herein take advantage of this phenomenum to characterize surface roughnesses.

It should be additionally noted that as used herein, the term "spatial coherence" does not necessarily require a large coherence width. The requirement is that the coherence width must be somewhat greater than the roughness width cutoff. Surface roughness components having undulations shorter than the roughness width cutoff can then be measured. As the roughness width cutoff is increased, the degree of spatial coherence must increase commensurately. Most commonly, a roughness width cutoff of 0.030 inches is used to measure the surface roughness of machined metal surfaces. For convenience, the coherence width can be defined by the following approximation: coherence width equals twice the mean wavelength divided by the angular extent of the "effective source" as seen from the rough surface. The "effective source" is a well known concept defined in greater detail in Hopkins, H. H.; *Proc. Roy. Soc. A 217*, pp. 408–432 (May 7, 1953); the teachings of which are hereby incorporated by reference.

DESCRIPTION OF PREFERRED EMBODIMENTS

The devices of this invention can be further described by referring to the Figures.

In FIG. I, lamp 1 emits light which is imaged by lens 2 onto pinhole aperture 3. Lamp 1 might be, for example, a tungsten-zirconium lamp. Pinhole aperture 3 acts, therefore, as a source of spatially coherent light having a wide spectral bandwidth. Alternatively, two or more lasers each having a different spectral frequency could be substituted for lamp 1, lens 2, and pinhole aperture 3.

Light from pinhole aperture 3 passes through collimating lens 4 to sample 6. The light is scattered by rough surface 7 and the resulting speckle pattern is imaged by imaging lens 8, which has a sample image plane 10, as shown. As can be seen by the lines representing light rays, collimated light not scattered by rough surface 7 is focused at viewing aperture 12. Scattered light, on the other hand, is imaged at sample image plane 10. Of course, an imaging lens need not be used, but is preferable in practice to obtain better control over the system parameters.

The imaged, scattered light is intercepted by a viewing aperture 12 and subsequently by a pinhole aperture 14 located immediately before a photometer 16. Photometer 16 collects the light scattered by rough surface 7 and which passes through pinhole aperture 14 to produce output data related to the speckle contrast of the sample. The image is scanned, which can be done by moving sample 6 as indicated by the arrow, or by moving the pinhole aperture 14 across the imaged reflected light, or by using moving elements in the optical path which scan the imaged light across pinhole aperture 14. The output from photometer 16 can be plotted and used to determine the mean intensity and average arithmetical absolute deviation from the mean which in turn, provides a direct indication of surface roughness. Of course, this can be done electronically.

FIG. II illustrates an alternate embodiment of a device as described herein which uses a non-linear light detector in combination with a reference light detector to provide output data which is directly related to surface roughness. Lamp 20 emits light having a wide spectral bandwidth. Spatial coherence is obtained by directing this light to lens 21 which images it at pinhole aperture 22. The spatially coherent, non-temporally coherent light passes through collimating lens 23 to first beam splitter 24. The portion of light which passes beam splitter 24 to sample 26 strikes surface 27 which is to be characterized. A portion of the scattered light from surface 27 is reflected by beam splitter 24 to imaging lens 28 which has a sample image plane 29 as shown. The imaged light passes through a viewing aperture 30 to a second beam splitter 32. The portion of the beam reflected from beam splitter 32 is directed to diffuser 34 and the diffused light is collected by reference photocell 36. Light transmitted through beam splitter 32 strikes photocell 38 which is a non-linear photoconductive cell.

Since the measured light intensity is kept fixed through measurements by reference photocell 36, the resistance difference between photocell 36 and photocell 38 is a measure of speckle contrast. This embodiment also provides output data directly related to surface roughness, and the use of the reference and non-linear photocells has a particular advantage since low light levels can be used because all of the light in the speckle pattern is measured simultaneously.

It will be recognized, of course, that the use of beam splitters in FIG. II and off-axis illumination in FIG. I are not limited to the respective detector systems used, and could be interchanged.

Those skilled in the art will recognize that certain interrelationships exist and must be taken into account when assembling optical systems as described herein. Since speckle is formed from interference between light reflected from different positions on the sample surface, this light must be allowed to come together at one spot in the detector plane. In practice, this can be done by looking at the speckle formed in an out-of-focus plane (as indicated in the diagrams) or by reducing the viewing aperture of the observing system so it has a broad point spread function. The width of the surface area from which light is allowed to interfere is set equal to the roughness width cutoff. In addition, the minimum speckle size is inversely proportional to the size of the system aperture so that the geometry of the system must be chosen to make the speckle larger than the scanning pinhole, maintaining the same roughness width cutoff.

FIG. III presents a plot of speckle contrast versus surface roughness expressed in microinches and as measured by a profilometer. The data presented herein was obtained using a set of standard roughness samples obtained from Baird Atomic Machine Company, Cambridge, Mass. The materials are included in the set entitled "Surface Finish Standards," Type 7, 2–500 microinch finishes, including polished, ground, blanchard ground, shaped, turned and milled samples. The data presented in FIG. III was obtained using an optical configuration as shown in FIG. I wherein the source was a Sylvania Concentrated-Arc Lamp C2T used directly to produce spatially coherent light having a wide spectral bandwidth. The collimating lens had a focal length of 9 inches, and the angles of incidence and reflection were 20°. An imaging lens having a focal length of 1.65 inches was located 1.8 inches from the sample. The viewing aperture (1 mm. dia.) was 1.05 inches from the lens and the pinhole aperture (0.035 mm. dia.) was located 3.2 inches from the viewing aperture. An RCA 931A photomultiplier was used to detect the speckle pattern. In this optical arrangement, the sample image plane was 18 inches behind the viewing aperture. The output intensity was plotted versus lateral movement of the sample. From the data obtained, a mean intensity was calculated and the arithmetic average absolute deviation from the mean determined. This procedure was repeated with different samples of known surface roughness, and the results plotted as shown in FIG. III. As can be seen, a linear relationship was found to exist between speckle contrast and surface roughness.

FIG. IV presents actual data obtained from an optical arrangement similar to that shown in FIG. II. The source, apertures, distances and lens focal lengths were the same as in the arrangement used to obtain the data of FIG. III. A Clairex CL603AL non-linear photoconductive cell was used. The received intensity was standardized for each sample by using the reference photocell (also a Clairex CL603AL) and a variable neutral density filter. Output voltage from a circuit monitoring the resistance difference between the non-linear and reference photocells was plotted directly versus surface roughness, and a good correlation was obtained as can be seen.

Although the Figures only illustrate the determination of surface roughness for opaque samples, it should be clear that the technique described herein is equally applicable with transparent samples such as glass elements with ground, rough surfaces.

AS pointed out above, it is normally a requirement of this invention that the illuminating light have a wide spectral bandwidth, i.e., the light is non-temporally coherent. However, there is one possible exception to this, and that is when the surface roughness is very small, e.g., the height of the surface irregularities are less than one quarter of a wavelength. Because perfectly smooth surfaces will not produce speckle, an increase in speckle contrast with increasing roughness is observed in the range of surface roughnesses from zero to a quarter of a wavelength in height. It may be more advantageous to measure the speckle contrast produced with laser light for these surfaces, because of the higher intensity obtained with a laser.

Those skilled in the art will know, or be able to construct using no more than routine experimentation, many optical arrangements different from those illustrated herein but within the scope of the claims which follow.

What is claimed is:

1. An optical device for characterizing surface roughness of a sample, comprising, in combination:
   a. a source of spatially coherent light having a wide spectral bandwidth;
   b. means to direct light from said source onto the rough surface to be characterized;
   c. instrument means for sensing the speckle pattern intensity contrast of said wide spectral bandwidth light scattered by the rough surface; and,
   d. means for establishing the overall statistical characteristics of deviations from the mean intensity of said speckle pattern.

2. A device of claim 1 wherein said means to sense the speckle pattern contrast comprises in sequence, an imaging lens, viewing aperture, pinhole aperture and light detector.

3. A device of claim 2 wherein additional means for effecting a scanning of the speckle pattern are provided.

4. A device of claim 3 wherein said means to direct light from said source includes a collimating lens located between said source and said sample.

5. A device of claim 1 wherein said means to sense the speckle contrast comprises an imaging lens and a beam splitter with a diffuser and a light detector on the reflected light side and a non-linear light detector on the transmitted light side.

6. A device of claim 5 wherein said means to direct light from said source includes a collimating lens and a second beam splitter located in the path of light from said source and positioned between said source and said sample.

7. A device of claim 6 wherein said means to image reflected light includes an imaging lens in the path of scattered light.

8. A process for characterizing the surface roughness of a sample, comprising:
   a. illuminating said sample with spatially coherent light having a wide spectral bandwidth;
   b. detecting the speckle pattern intensity contrast and said light scattered by said rough surface; and,
   c. determining overall statistical characteristics of deviations from the mean intensity of said speckle pattern.

9. An optical device for characterizing extremely smooth surfaces, comprising:
   a. a source of laser light;
   b. means to direct said light onto said smooth surface;
   c. means to detect the speckle pattern intensity contrast of the light scattered by said surface; and,
   d. means for establishing the overall stastical characteristics of deviations from the mean intensity of said speckle pattern.
   d. means for establishing the overall stastical characteristics of deviations from the mean intensity of said speckle pattern.

* * * * *